(12) United States Patent
Zhang et al.

(10) Patent No.: US 9,359,542 B2
(45) Date of Patent: Jun. 7, 2016

(54) PREPARATION METHOD OF POLYMERIC PHASE-CHANGE MATERIAL

(71) Applicant: TIANJIN POLYTECHNIC UNIVERSITY, Tianjin (CN)

(72) Inventors: Xing Xiang Zhang, Tianjin (CN); Xiao Fen Tang, Tianjin (CN); Jie Yun Meng, Tianjin (CN); Hai Feng Shi, Tianjin (CN); Zhi Li Zhang, Tianjin (CN)

(73) Assignee: Tianjin Polytechnic University, Tianjin (CN)

( * ) Notice: Subject to any disclaimer, the term of this patent is extended or adjusted under 35 U.S.C. 154(b) by 0 days.

(21) Appl. No.: 14/412,183

(22) PCT Filed: Mar. 21, 2013

(86) PCT No.: PCT/IB2013/000445
§ 371 (c)(1),
(2) Date: Dec. 30, 2014

(87) PCT Pub. No.: WO2014/006464
PCT Pub. Date: Jan. 9, 2014

(65) Prior Publication Data
US 2015/0203733 A1 Jul. 23, 2015

(30) Foreign Application Priority Data
Jul. 3, 2012 (CN) .......................... 2012 1 0227744

(51) Int. Cl.
| | |
|---|---|
| *C08F 2/46* | (2006.01) |
| *C08F 2/50* | (2006.01) |
| *C08G 61/04* | (2006.01) |
| *C09K 5/06* | (2006.01) |
| *C08F 120/28* | (2006.01) |
| *C08F 2/06* | (2006.01) |
| *C08F 2/48* | (2006.01) |
| *C08F 220/28* | (2006.01) |
| *C08F 290/06* | (2006.01) |
| *D06M 15/27* | (2006.01) |
| *B01J 13/16* | (2006.01) |
| *C08F 122/20* | (2006.01) |
| *C08F 222/20* | (2006.01) |
| *D01F 8/10* | (2006.01) |
| *D06M 101/06* | (2006.01) |

(52) U.S. Cl.
CPC ................ *C09K 5/063* (2013.01); *B01J 13/16* (2013.01); *C08F 2/06* (2013.01); *C08F 2/48* (2013.01); *C08F 120/28* (2013.01); *C08F 122/20* (2013.01); *C08F 220/28* (2013.01); *C08F 222/20* (2013.01); *C08F 290/062* (2013.01); *D06M 15/27* (2013.01); *D01F 8/10* (2013.01); *D06M 2101/06* (2013.01)

(58) Field of Classification Search
USPC ............. 522/39, 33, 6, 71, 189, 184, 1; 520/1
See application file for complete search history.

(56) References Cited

FOREIGN PATENT DOCUMENTS

| | | | |
|---|---|---|---|
| CN | 101798364 | * | 8/2010 |
| JP | 11-349829 | * | 12/1999 |

OTHER PUBLICATIONS

Kuribayashi et al, JP 11349829 Machine Translation, Dec. 21, 1999.*
Zhang et al, CN 101798364 Machine Translation, Aug. 11, 2010.*

* cited by examiner

*Primary Examiner* — Ling Choi
*Assistant Examiner* — Jessica E Whiteley
(74) *Attorney, Agent, or Firm* — Seed IP Law Group PLLC

(57) ABSTRACT

The invention relates to a preparation method of a polymeric phase-change material, comprising: using 1, 2 or 3 of (meth) acrylate poly(ethylene glycol) n-alkyl ether ester as a raw material, wherein the (meth)acrylate poly(ethylene glycol) n-alkyl ether ester has a structural general formula of $CH_2=C(CH_3)—COO(CH_2CH_2O)_m C_n H_{2n+1}$ or $CH_2=CH—COO(CH_2CH_2O)_m C_n H_{2n+1}$, m=1 to 100, and n=10 to 50; washing the raw material with a solution of sodium hydroxide, potassium hydroxide, sodium carbonate or potassium carbonate having a mass percentage of 1% to 10% to remove a polymerization inhibitor, and subjecting reduced-pressure distillation, and then to a polymerization reaction by adopting one of the following process; 1. polymerization reaction initiated by irradiation; 2. polymerization reaction initiated by an initiator; 3. polymerization reaction in a solvent; after the polymerization reaction is completed, adding a precipitating agent to precipitate the polymeric phase-change material from the solution, and then washing with deionized water and dried, to obtain a polymeric phase-change material as a powder to block.

8 Claims, No Drawings

PREPARATION METHOD OF POLYMERIC PHASE-CHANGE MATERIAL

BACKGROUND

1. Technical Field

The present invention relates to a polymeric phase-change material preparation technology, and more particularly to a preparation method of a polymeric phase-change material with heat storage and release functions.

2. Related Art

Phase-change materials are a type of energy-saving and environmental-friendly materials that are developed and applied in 1970s. During phase change, the phase-change material can absorb or release a great amount of latent heat, are widely used in the fields of heating, ventilating and air conditioning, construction, use of solar energy, and clothing, and have great significance in the aspect of "energy saving and emission reduction". The most widely used phase-change materials are classified into the following two types, namely, solid-liquid phase-change materials such as normal paraffins, and hydrated inorganic salts and solid-solid phase-change materials such as polyols. Most of the solid-liquid phase-change materials are low-molecular-weight compounds, such as inorganic salts, normal paraffins, high fatty alcohols, high fatty acids or high fatty esters. When phase change occurs, the volume change is large, and the thermal stability of the normal paraffins and the hydrated inorganic salts is poor. When being in a liquid state, the materials easily flows, so that the shape retention property is poor, and loss or pollution are likely caused. Due to the phase change, the materials need to be sealed in a container or to be mixed with other absorption support material to obtain a fixed shape before use. As for the solid-solid phase-change materials such as high fatty alcohol, high fatty acid or high fatty ester phase-change materials, when being heated to a temperature higher than the solid-solid phase change temperature, the materials are changed from a crystalline solid into a plastic crystal, because the vapor pressure is high, the materials are easily volatilized and suffers loss, so that the materials needs to be sealed in a container in use. Moreover, as the phase change temperature is high, it is difficult for the phase change materials to satisfy the requirements for use in a low-temperature environment. In addition, there are few types of such materials, therefore few choices are available in the industry. The currently known polymeric phase-change materials are mainly aliphatic polyether and aliphatic polyester, such as polyethylene glycol, polybutylene glycol and polyhexamethylene adipate. However, as the materials are solid-liquid phase-change materials, and when being in a molten state, the materials easily flows; moreover, the heat-resistant temperature is low, the use is also limited. Chinese Invention Patent CN1616588A discloses a preparation method of a high-molecular weight phase-change material. According to the structure of the material, an organic material having a low melting point and high phase change enthalpy are fixed on a high-melting point or infusible framework through a chemical bond, which is specifically fixing a polymeric phase-change material polyethylene glycol having two active terminal groups and a polyethylene glycol having one active end group on a high-molecular weight framework material, to form a three-dimensional network and comb composite structure, so that the material maintains the solid state during phase change, and has the solid-solid phase change characteristics. Chinese Invention Patent CN1710012A discloses a technology of preparing a solid-solid phase-change material by grafting polymeric phase-change material having an active group at one terminal or two terminals, namely, polyethylene glycol on a surface of nano-cellulose or a derivative thereof. In the two invention patent applications, polyethylene glycol is used as the phase-change material, so the application scope is narrow. In an earlier patent, namely, Chinese Invention Patent CN101798364A, the applicant of the present invention discloses a preparation method of a novel polymeric phase-change material poly(n-alkyl methacrylate), where solid-solid phase change of the phase-change material is achieved without using a framework material. However, due to the existence of the ester group with strong polarity in the polymeric phase-change material, a part of carbon atoms in the n-alkyl cannot be crystallized; moreover, the phase change enthalpy is low.

SUMMARY

In order to overcome the shortcomings of the prior art, the present invention is to provide a preparation method of a polymeric phase-change material which can solve the technical problem existing in the prior art. According to the preparation method, a polymeric phase-change material can be prepared directly through a polymerization reaction without grafting or using other high-molecular-weight skeleton support materials or coating materials. The preparation method has the following advantages that the process is simple and easily controlled with high productivity and wide range of application, and convenient for practical application. The polymeric phase-change material prepared by the claimed method has a good thermal stability.

A technical solution provided in the present invention is to design a preparation method of a polymeric phase-change material, which includes: using 1, 2 or 3 of (meth)acrylate poly(ethylene glycol) n-alkyl ether esters as a raw material, where the (meth)acrylate poly(ethylene glycol) n-alkyl ether ester has a structural general formula of $CH_2=C(CH_3)-COO(CH_2CH_2O)_mC_nH_{2n+1}$, or $CH_2=CH-COO(CH_2CH_2O)_mC_nH_{2n+1}$, m=1 to 100, and n=10 to 50. When the raw material is 2 or 3 of the methacrylate poly(ethylene glycol) n-alkyl ether esters, the molar content of any raw material is not lower than 10%, and the sum of the molar contents of the 2 or 3 of the (meth)acrylate poly(ethylene glycol) n-alkyl ether esters in the mixture is 100%; washing the raw material with a solution of sodium hydroxide, potassium hydroxide, sodium carbonate or potassium carbonate having a mass percentage of 1% to 10% to remove a polymerization inhibitor, and subjecting to reduced-pressure distillation, and then to a polymerization reaction by adopting one of the following processes:

(1) polymerization reaction initiated by irradiation;

(2) polymerization reaction initiated by an initiator: the initiator is a free radical polymerization initiator, a redox initiator, an anionic polymerization initiator or a cationic polymerization initiator; and (3) polymerization reaction in a solvent: the solvent is a non-polar organic solvent or a polar organic solvent, where the non-polar organic solvent includes, but not limited to, benzene, toluene or xylene, polar organic solvent includes, but not limited to, tetrahydrofuran, acetone, methyl ethyl ketone, N,N-dimethylformamide or N,N-dimethylacetamide; the ratio of the (meth)acrylate poly(ethylene glycol) n-alkyl ether ester to the solvent is 4:1 to 1:4; and after the polymerization reaction is completed, adding a precipitating agent-water, methanol or ethanol to the reaction solution, to precipitate the polymeric phase-change material from the solution, and then washing with deionized water and dried, to obtain a polymeric phase-change material as a powder or block.

As to compare with the prior art, an organic monomer is used as a raw material in the preparation method of the present invention to prepare a novel polymeric phase-change material through a polymerization reaction. The preparation method of the present invention has the following features: (1) an organic monomer is used as a raw material, a polymeric phase-change material can be directly obtained through a polymerization reaction, without a grafting reaction or using a framework support or coating material, so that the process is simple with high productivity; (2) a branch chain that may undergo phase change is fixed on a polymer main chain, thereby overcome the leakage problem occurred in the phase change material and enhance the materials stability; (3) by adjusting the degree of polymerization m of polyethylene glycol or the number n of carbon atoms of the n-alkyl ether moiety and using a polymer of 2 to 3 monomers, the phase change temperature of the polymeric phase-change material can be changed as required, thereby overcome the problem that the phase change temperature of phase-change material is difficult to meet the requirements for use arising from the fact that only one phase-change material is used so as to obtain a series of phase-change materials which can satisfy the requirements for being used in different environments; (4) a flexible polyethylene glycol chain that cannot be crystallized is used to connect a n-alkyl that can be crystallized to a poly(methacrylic acid) main chain, thereby solving the problem that a part of carbon atoms in the n-alkyl moiety cannot be crystallized caused by high polarity of the connection bond, and the difference between the melting temperature and the crystallization temperature is large, the enthalpy is lowered, and the use effect is influenced; and (5) the prepared polymeric phase-change material has a good thermal stability. The phase-change material prepared by the preparation method of the present invention has good application prospect in the fields of solar energy storage, thermo-regulated fibers and clothing, and energy-saving building structures.

BRIEF DESCRIPTION OF THE DRAWINGS

No drawings.

DETAILED DESCRIPTION

The present invention is further described below with reference to the following embodiments.

The preparation method of a polymeric phase-change material (referred to preparation method hereinafter for short) designed in the present invention adopts the following processes:

1 to 3 of (meth)acrylate poly(ethylene glycol) n-alkyl ether esters (referred to as AEA for short) is used as a raw material, where the (meth)acrylate poly(ethylene glycol) n-alkyl ether ester has a structural general formula of $CH_2=C(CH_3)-COO(CH_2CH_2O)_m C_n H_{2n+1}$ or $CH_2=CH-COO(CH_2CH_2O)_m C_n H_{2n+1}$, m=1 to 100, and n=10 to 50, and when the raw material is 2 or 3 of the (meth)acrylate poly(ethylene glycol) n-alkyl ether esters, the molar content of any raw material is not lower than 10%, and the sum of the molar contents of 2 or 3 of the (meth)acrylate poly(ethylene glycol) n-alkyl ether esters in the mixture is 100%, and the raw material is washed with a solution of sodium hydroxide, potassium hydroxide, sodium carbonate or potassium carbonate having a mass percentage of 1% to 10% to remove a polymerization inhibitor, and subjected to reduced-pressure distillation, and then to a polymerization reaction by adopting one of the following processes:

(1) Polymerization reaction initiated by irradiation: The irradiation initiation refers to in the absence of an initiator, a polymerization reaction is initiated by UV irradiation, electron beam irradiation or γ-ray irradiation, to prepare the polymeric phase-change material of the present invention. Time required for irradiation initiation depends on the type of irradiation and the irradiation dose, and is not particularly limited, provided that the polymerization reaction can be initiated. That is to say, the irradiation initiation condition is suitable for the prior art.

(2) Polymerization reaction initiated by an initiator: the initiator is a (atom transfer) free radical polymerization initiator, a redox initiator, an anionic polymerization initiator or a cationic polymerization initiator; and the polymerization reaction belongs to the prior art.

(3) Polymerization reaction in a solvent: when the polymerization reaction is carried out in a solvent, it is required that AEA and the polymer can form a uniform solution in the solvent. Preferably, the solvent can dissolve AEA and the polymer. Tests show that the solvent may be a non-polar organic solvent, including, but not limited to benzene, toluene or xylene, and may also be a polar organic solvent, including, but not limited to tetrahydrofuran, acetone, methyl ethyl ketone, N,N-dimethylformamide or N,N-dimethylacetamide. By adopting the solvent polymerization process, the heat generated by the polymerization reaction can be transferred out of the reactor, thereby preventing occurrence of explosive polymerization and formation of an uneven polymer structure and uneven properties caused by local overheating, so as to ensure the quality of the polymer product.

Preferably, the ratio of AEA to the solvent should allow that AEA and the polymer are uniformly dissolved. Studies show that, the ratio of AEA to the solvent is preferably 4:1 to 1:4.

After the polymerization reaction is completed, a precipitating agent-water, methanol or ethanol is added to the reaction solution, to precipitate the polymeric phase-change material from the solution, and then the polymeric phase-change material is washed with deionized water and dried, to obtain the polymeric phase-change material as a powder. A conventional method such as a molecular sieve, anhydrous calcium chloride or a vacuum oven is used to dry the polymeric phase-change material.

In order to obtain a polymeric phase-change material with a good structure and good properties, according to the use requirements of the polymer product, the present invention is further characterized in that at least one additive of an auxiliary initiator, a chain transfer agent, a heat stabilizer and a UV absorbent. The type and amount of the additive are not particularly limited, and belong to the prior art.

Addition of the auxiliary initiator is to improve the initiation effect that is decreased due to the deceased initiator efficiency during the reaction. The auxiliary initiator refers to an auxiliary substance that is added to enable that AEA is initiated with a high efficiency, such as, α-amino ketone added during UV irradiation polymerization, so as to improve the initiation efficiency and shorten the irradiation time. The amount of the auxiliary initiator is 0.1% to 5% of the mass of AEA.

The chain transfer agent refers to a molecular weight modifier that is added to control the number average molecular weight distribution of a polymer in a polymerization reaction. The chain transfer agent in the present invention may be, but not limited to, 2-mercaptoethanol, dodecyl mercaptan or dithioester. The amount of the chain transfer agent is 0.1% to 3% of the mass of AEA. The chain transfer agent is added to the reaction system together with the polymerization mer.

The heat stabilizer refers to a substance that enables the polymeric phase-change material to maintain a stable structure and stable properties after being heated and melted. The heat stabilizer of the present invention may be, but not limited to, 2,6-tert-butyl-4-methylphenol (antioxidant-264), tetra(4-hydroxy-3,5-di-tert-butylphenyl propionate)pentaerythritol ester (antioxidant-1010), n-octadecyl 3,5-di-tert-butyl-4-hydroxyphenyl propionate (antioxidant-1076), n-triphenyl phosphite (TPP) or n-trinonylphenyl phosphite (TNP). The amount of the heat stabilizer is 0.1% to 3% of the mass of AEA. When the polymeric phase-change material is prepared by adopting a solution process, the heat stabilizer is blended with the polymeric phase-change material after filtering, and when the polymeric phase-change material is prepared by adopting a twin screw extrusion process, the heat stabilizer is added to the reaction system together with the mer.

The UV absorbent refers to a substance that can absorb high-energy UV, and perform energy conversion to convert UV into low-energy thermal energy or an electromagnetic wave with a short wavelength, so as to reduce the damage of UV on the molecular chain structure of the polymeric phase-change material, and achieve the purpose of make the polymeric phase-change material stable to UV irradiation. The UV absorbent may be, but not limited to, one of the following substances: a benzophenone such as UV-9, UV-531 or M-40; a benzotriazole such as UV-P, UV-236 or UV-327; an n-alkyl salicylate such as TBS or BAD, and the amount of the UV absorbent is 0.1% to 3% of the mass of EAE. When the polymeric phase-change material is prepared by adopting a solution process, the UV absorbent is blended with the polymeric phase-change material after filtering, and when the polymeric phase-change material is prepared by adopting a twin screw extrusion process, the UV absorbent may be added to the reaction system together with the mer.

By copolymerizing a methacrylate-(polyethylene glycol) n-alkyl ether ester and an acrylate-(polyethylene glycol) n-alkyl ether ester at a ratio of 9:1 to 1:9, or copolymerizing more than two (meth)acrylate poly(ethylene glycol) n-alkyl ether esters having different numbers m of ethylene glycol repeating units and numbers n of carbon atoms, a phase-change material having suitable heat absorption temperature or heat release temperature can be obtained, so as to meet different use requirements. However, due to different n-alkyl carbon chain lengths and different crystallization degree and crystal systems of the copolymers obtained by copolymerization of different (meth)acrylate poly(ethylene glycol) n-alkyl ether ester monomers, the heat absorption and heat release performances of the resulting copolymer are influenced. Therefore, in the preparation of the copolymer, it is designed that the number of the monomers that participate the polymerization reaction should not be large, and is preferably no more than five, and in the present invention, is no more than three, so as to obtain a polymeric phase-change material with good crystallization properties.

The preparation polymerization reaction of the (meth)acrylate poly(ethylene glycol) n-alkyl ether ester monomer includes: an esterification reaction between methacrylic acid and polyethylene glycol n-alkyl ether, a transesterification reaction between methyl (meth)acrylate and polyethylene glycol n-alkyl ether, and an alcoholysis reaction between methacryloyl chloride and polyethylene glycol n-alkyl ether. During the monomer polymerization preparation, a polymerization inhibitor of 0.05% to 0.1% of the mass of AEA needs to be added, to prevent occurrence of a polymerization reaction, and the amount of the polymerization inhibitor is adjusted according to the polymerization in the monomer preparation process, and relevant knowledge is in the range that persons of ordinary skill in the art should know.

The polymerization of a (meth)acrylate poly(ethylene glycol) n-alkyl ether ester (monomer) may by irradiation initiated polymerization, (atom transfer) free radical polymerization, redox polymerization, anionic polymerization or cationic polymerization. The polymerization method has not significant influence on the properties of the resulting polymeric phase-change material.

As a large amount of heat is generated during the polymerization of the (meth)acrylate poly(ethylene glycol) n-alkyl ether ester monomer, a bulk polymerization method is generally not adopted to prepared the polymeric phase-change material, but a solution polymerization method is adopted, so that the heat generated during the polymerization can be taken away by the solvent, thereby preventing occurrence of explosive polymerization or vaporization caused by local overheating. However, if the polymerization is carried out in a screw extruder, the heat generated by the polymerization reaction can be taken away by controlling the flow or temperature of the circulating water in a screw jacket, and the polymerization reaction is controlled to be carried out at a suitable temperature, thereby preventing occurrence of explosive polymerization or vaporization.

The phase change temperature of the polymeric phase-change material of the present invention has molecular weight dependence on the molecular weight or the degree of polymerization of a (meth)acrylate poly(ethylene glycol) n-alkyl ether ester, that is, the phase change temperature is increased with the increase of the molecular weight of the polymer or the degree of polymerization, and eventually tends to a constant value. Therefore, in order to meet different use requirements, the molecular weight of the polymer needs to be controlled sometimes.

The (meth)acrylate poly(ethylene glycol) n-alkyl ether ester of the present invention has a structural general formula below:

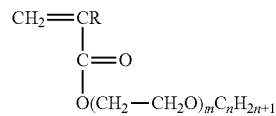

where, H or R=—H or —CH$_3$; m=1 to 100; and n=10 to 50.

The polyethylene glycol block of the polymeric phase-change material of the present invention mainly has the flexible connecting function, but the phase-change properties of the polymer may be influenced by different numbers m of the repeating unit, and m is generally controlled to be m=1 to 100, and preferably 2 to 50. Even if the number of the repeating unit exceeds the range, the polyethylene glycol block still has the phase-change and energy-storage functions.

The branch chain of the polymeric phase-change material of the present invention, namely, the n-alkyl can be crystallized alone and form different crystal systems depending on the different numbers of carbon atoms. When the number n of carbon atoms in the n-alkyl is 9 or less, the n-alkyl is generally in a liquid state at room temperature, and the polymer of the n-alkyl is also in a liquid state and cannot be crystallized, thus having no phase-change and energy-storage functions; on the contrary, when the number n of carbon atoms in the n-alkyl is 50 or more, the melting temperature is excessively high, and cannot exert phase-change and energy-storage functions at a low temperature. Studies show that, when the number n of carbon atoms in the n-alkyl is 12 to 22, the heat absorption temperature and the heat release temperature of the polymer are in the range of 15° C. to 60° C., which are close to the daily ambient air temperature, so such phase-change materials are the widely used phase-change materials. When the number n of carbon atoms in the n-alkyl is 12 to 22, the heat absorption capacity and the heat release capacity of the poly((meth) acrylate poly(ethylene glycol) n-alkyl ether ester) are in the range of 40 to 160 J/g, so such phase-change materials have a good energy-storage function.

A polymeric phase-change material, that is, poly((meth) acrylate poly(ethylene glycol) n-alkyl ether ester) having a stable shape can be prepared by using the preparation method of the present invention. The phase-change material is formed by directly polymerizing monomers, and the n-alkyl branch chain has the energy-storage function, and can be crystallized at a certain temperature and release heat, or the crystal of the n-alkyl branch chain can be melted at a certain temperature and absorb heat. The main chain of the poly((meth)acrylate poly(ethylene glycol) n-alkyl ether ester) molecule ensures that no transfer or leakage occurs even when the n-alkyl moiety is in a molten state, because the n-alkyl is fixed on the polymer molecular chain in the form of a branch chain through covalent chemical bonds. The preparation method of the present invention is essentially different from the prior art in which a polymer and a low-molecular weight phase-change material are blended to prepare a phase-change material having a fixed shaped, and is significantly different from the prior art in which polymeric phase-change material having an active functional group, such as an aliphatic polyether, is grafted to a high-molecular weight molecule.

The use of the phase-change material-(meth)acrylate poly (ethylene glycol) n-alkyl ether ester includes, but not limited to:

(1) being used to prepare a capsule wall material: the phase-change material of the present invention is used alone as a wall material of microcapsules or nanocapsules, or a copolymer of the phase-change material of the present invention and an alkene monomer such as (meth)acrylate, (meth) acrylic acid and styrene is used as a wall material of microcapsules or nanocapsules, which is used to prepare a phase-change material microcapsules or nanocapsules with a low degree of supercooling;

(2) being used to prepare a thermo-regulated fiber, which is further used to produce a thermo-regulated textile;

(3) being used as a finishing agent of textile materials to prepare a textile having a thermo-regulated function; and (4) being used as an energy-saving material for building.

Unless otherwise stated, the properties of the polymeric phase-change material of the present invention are characterized by using the following devices and methods: AVANCE AV 300 MHz1H-NMR is used to perform NMR analysis. Using a NETZSCH DSC 200 F3 differential scanning calorimetry (DSC), in a nitrogen atmosphere, DSC scanning curves of a 10° C./min heating process and a −10° C./min cooling process are tested. The thermal decomposition temperature (temperature at which 5 wt % of the sample is lost) of a dried sample in the air is detected in a 10° C./min heating process by using a NETZSCH, STA409PC/PG TG-DTA thermogravimetric analyzer (TG).

The content of the present invention that is not described herein can apply the prior art.

Specific embodiments of the present invention are described below: the embodiments are merely intended to further describe the present invention in detail, but not to limit the scope of the present invention.

Embodiment 1

Benzene was used as a solvent, hydroquinone was used as a polymerization inhibitor, p-toluenesulfonic acid was used as a catalyst, and polyethylene glycol n-hexadecyl ether (m=2, n=16) and methacrylic acid at a molar ratio of 1:1.2 were refluxed and reacted at 80° C. for 20 hrs; after the byproduct water was evaporated, a suitable amount of potassium carbonate was added to the reaction mixture to remove free methacrylic acid and the catalyst; after filtering, the solvent was removed from the filtrate through rotary evaporation, to obtain methacrylate poly(ethylene glycol) n-hexadecyl ether ester.

$FeCl_2 \cdot 4H_2O$ was used as a catalyst, triphenylphosphine ($PPh_3$) was used as a complexing agent, n-ethyl 2-bromopropionate (EBP) was used as an initiator, and toluene was used as the solvent, where the mass ratio of methacrylate poly (ethylene glycol) n-hexadecyl ether ester to toluene was 1:1, methacrylate poly(ethylene glycol) n-hexadecyl ether ester, EBP, $FeCl_2 \cdot 4H_2O$ and $PPh_3$ at a molar ratio of 68:1:30:1 were reacted at 80° C. for 4 hrs, and excessive amount of methanol was added to precipitate the product, and the product was washed three times, and dried in a vacuum oven to a constant weight at 80° C., to obtain a white powder substance. Elemental analysis showed that, the purity of poly(methacrylate poly (ethylene glycol) n-hexadecyl ether ester) was up to 95%, the melting temperature was 42.6° C., the crystallization temperature was 31.0° C., the phase change enthalpy was 110 J/g, the thermogravimetric temperature was 261° C. After the resulting white powder substance was heated 20 times in a cyclic manner in the range of 20° C. to 200° C., no leakage of a liquid substance was observed.

Poly(methacrylate poly(ethylene glycol) n-hexadecyl ether ester) of 99.5% by mass, an antioxidant 1010 of 0.3% by mass and UV-9 of 0.2% by mass were mixed and used as an ingredient A of a fiber, and a polyethylene terephthalate-polyethylene glycol (at a molar ratio of 70:30) copolymer (having an intrinsic viscosity of 0.68) was used as an ingredient B of a fiber. The two ingredients were dried to a moisture content of lower than 120 ppm, and the mass ratio of A to B was controlled to be 30:70. At 220° C., a sea-island type as-spun filament was produced through melt composite spinning, drawn and twisted, to obtain a thermo-regulated filament.

The titer of the product fiber was 140 dtex/48f, the tensile strength at break was 2.5 cN/dtex, the elongation at break was 36%; the heat absorption temperature of the fiber was 42.5° C., the heat absorption capacity was 25 J/g, the heat release temperature was 29.1° C., the heat absorption capacity was 26 J/g, and the 5% weight-loss temperature was 234° C.

Embodiment 2

To a 1000 ml-three-necked flask equipped with a thermometer, a condenser and a stirrer, predetermined mass of polyethylene glycol n-octadecyl ether (m=20, n=18) and a polymerization inhibitor hydroquinone were added and heated to 60° C. After AEA and hydroquinone were stirred uniformly, a certain amount of acrylic acid and a catalyst p-toluenesulfonic acid were added in sequence with stirring and heated continuously to 110° C., and after 5-hr reaction, heated to 140° C. When no water was generated any more, the reaction was completed. After being cooled to 90° C., the reaction system was subjected to reduced-pressure distillation to remove unreacted acrylic acid and water, the catalyst and the polymerization inhibitor were precipitated as colorless crystals, and then separated, to obtain a brown-yellow transparent liquid. The crude product was adjusted to be neutral with a $Na_2CO_3$ solution having a mass concentration of 5%, and then washed with a saturated NaCl solution and extracted with 150 ml diethyl ether. The organic layer was separated and filtered, dried in vacuum at a low temperature for 24 hrs, to obtain a pure product acrylate poly(ethylene glycol) n-octadecyl ether ester.

To acrylate poly(ethylene glycol) n-octadecyl ether ester of 99.8% by mass, dodecyl mercaptan of 0.2% by mass was added, and then mixed with toluene at a mass ratio of 1:2, to which AEA azobisisobutyronitrile of 0.08% by mass was added. The reaction was carried out at 70° C. for 5 hrs with stirring, and then subjected to reduced-pressure distillation to remove toluene, to obtain a polymeric phase-change material. Elemental analysis showed that, the purity of poly(acrylate poly(ethylene glycol) n-octadecyl ether ester) was up to 93%, the melting temperature was 52.6° C., the crystallization temperature was 42.3° C., the phase change enthalpy was 105 J/g, and the weight-loss temperature was 267° C. After the resulting white powder substance was heated 20 times in a cyclic manner in the range of 20° C. to 200° C., no leakage of a liquid substance was observed.

A mixture of poly(acrylate poly(ethylene glycol) n-octadecyl ether ester) of 99.7% by mass and UV-327 of 0.3% by mass was used as an ingredient A of a fiber, and polyacrylonitrile (having a number average molecular weight of 34,000) was used as an ingredient B of a fiber. The two ingredients were dried to a moisture content of lower than 110 ppm, the ingredient B was dissolved in DMF, to obtain a solution having a mass concentration of 10%, and the mass ratio of A to B was controlled to be 30:70. At 60° C., a fiber with a concentric type cross-section was produced thorough solution electrostatic composite spinning, and the fiber was collected by a flat plate collector.

It was detected that the product fiber had a net structure, and the diameter of filament was 300 to 1600 nm. The heat absorption temperature of the fiber was 52.3° C., the heat absorption capacity was 35 J/g, the heat release temperature was 42.6° C., the heat absorption capacity was 36 J/g, and the 5% weight-loss temperature was 245° C.

Embodiment 3

Polyethylene glycol n-docosyl ether (m=50, n=22) was used to replace polyethylene glycol n-hexadecyl ether (m=2, n=16) in Embodiment 1, and the other reagents and process parameters were the same as those in Embodiment 1, to obtain methacrylate-(polyethylene glycol) n-docosyl ether ester. Methyl (meth)acrylate, methacrylate-(polyethylene glycol) n-docosyl ether ester and ethylene glycol diacrylate were mixed at a molar ratio of 6:3:1 and used as a wall material of a phase-change material microcapsule and n-octadecane was used as a capsule core material, to prepare an n-octadecane microcapsule having an average particle size of 2.3 micrometers through interfacial polymerization, where the crystallization temperature of n-octadecane was the same as that of the main body. Methyl (meth)acrylate and ethylene glycol diacrylate were mixed at a molar ratio of 9:1 to prepare an n-octadecane microcapsule having an average particle size of 2.3 micrometers, where the crystallization temperature of n-octadecane is 18° C. lower than that of the main body. In methacrylate-(polyethylene glycol) n-docosyl ether ester, the crystallization temperature of docosyl is significantly higher than that of the n-octadecane, so docosyl is first crystallized during the cooling process, and the crystal of docosyl serves as a nuclei in the crystallization of n-octadecane, thereby promoting the development of heterogeneous nucleation and crystallization and preventing the occurrence of supper-cooling crystallization.

Embodiment 4

To a 500 ml-three-necked flask equipped with a thermometer, a reflux condenser, a stirrer and a water separator, a certain amount of polyethylene glycol n-dodecyl ether (m=10, n=12), toluene, p-toluenesulfonic acid and hydroquinone were added and heated to 60° C., and completely dissolved. Then, acrylic acid was added and continuously heated to 125° C., and a reaction was carried out for 4 hrs at 125° C., and the esterification reaction was completed. The reaction mixture was poured into a distillation flask, and subjected to reduced-pressure distillation to remove unreacted acrylic acid and the solvent. The crude product was poured into a separatory funnel, neutralized and washed with a NaOH solution having a mass concentration of 5%, to remove the catalyst and the polymerization inhibitor, till the water layer was colorless. The resulting product was washed repeatedly to neutral with a large amount of deionized water and dried with anhydrous $CaCl_2$ for 24 hrs, to obtain acrylate-(polyethylene glycol) n-dodecyl ether ester. The esterification rate was 98%.

Acrylate-(polyethylene glycol) n-dodecyl ether ester was dissolved in tetrahydrofuran, to obtain a solution having a mass concentration of 20%, to which benzoyl peroxide of 0.1% of the mass of acrylate-(polyethylene glycol) n-dodecyl ether ester was added, and a reaction was carried out at 75° C. for 4 hrs. The solution was cooled, and an excessive amount of water was added to the solution to precipitate the polymerization product. The resulting product was washed 3 times, dried in a vacuum oven to a constant weight at 80° C. $^1$H-NMR analysis showed that the generated substance was a poly(acrylate-(polyethylene glycol) n-dodecyl ether ester); and elemental analysis showed that, the purity was up to 93%, the heat absorption temperature was 37.2° C., the melting enthalpy was 72 J/g, and the weight-loss temperature was 251° C. After the resulting polymer powder was heated 20 times in a cyclic manner in the range of 20° C. to 200° C., no leakage of a liquid substance was observed, and no obvious change in the powder quality was observed.

Embodiment 5

Methacrylate poly(ethylene glycol) n-hexadecyl ether ester (m=10, n=16) and acrylate (polyethylene glycol) n-octadecyl ether ester (m=2, n=18) were mixed at a molar ratio of 9:1 and dissolved in toluene, where the mass ratio of the monomers to toluene was 1:3. To the solution, azobisisoheptonitrile of 0.2% of the mass of the monomers was added, and reacted at 75° C. for 5 hrs with stirring. The solution was cooled, to which an excessive amount of ethanol was added to precipitate the polymerization product. The resulting product was washed 3 times and dried to a constant weight in a vacuum oven at 80° C. $^1$H-NMR analysis showed that, the generated substance was a copolymer of the two mers, namely, methacrylate poly(ethylene glycol) n-hexadecyl ether ester and acrylate poly(ethylene glycol) n-octadecyl ether ester; DSC and TG tests showed that the copolymer had significant heat absorption and release functions and a good thermal stability.

Embodiment 6

Methacrylate poly(ethylene glycol) n-hexadecyl ether ester (m=2, n=16) and acrylate poly(ethylene glycol) n-octadecyl ether ester (m=50, n=18) were mixed at a molar ratio of 1:9 and dissolved in toluene, where the mass ratio of the monomers to toluene was 1:3. To the solution, azobisisoheptonitrile of 0.2% of the mass of the monomers was added, and reacted at 75° C. for 5 hrs with stirring. The solution was cooled, to which an excessive amount of ethanol was added to precipitate the polymerization product. The resulting product was washed 3 times and dried to a constant weight in a vacuum oven at 80° C. $^1$H-NMR analysis showed that, the generated substance was a copolymer of the two mers, namely, methacrylate poly(ethylene glycol) n-hexadecyl ether ester and acrylate poly(ethylene glycol) n-octadecyl ether ester; DSC and TG tests showed that the copolymer had significant heat absorption and release functions and a good thermal stability.

Embodiment 7

Acrylate-(polyethylene glycol) n-dodecyl ether ester (m=10, n=12) and acrylate-(polyethylene glycol) n-tetradecyl ether ester (m=10, n=14) were mixed at a molar ratio of 5:5 and dissolved in toluene, where the mass ratio of the monomers to toluene was 1:3. To the solution, α-amino ketone of 0.5% of the mass of the monomers was added, stirred at 25° C., and the reaction was carried out for 5 hrs under UV irradiation. To the solution, an excessive amount of ethanol was added to precipitate the polymerization product. The resulting product was washed 3 times and dried to a constant weight in a vacuum oven at 80° C. $^1$H-NMR analysis showed that, the generated substance was a copolymer of the two mers, namely, acrylate-(polyethylene glycol) n-dodecyl ether ester and acrylate-(polyethylene glycol) n-tetradecyl ether ester; DSC and TG tests showed that the copolymer had significant heat absorption and release functions and a good thermal stability.

Embodiment 8

Acrylate poly(ethylene glycol) n-hexadecyl ether ester (m=10, n=16), methacrylate poly(ethylene glycol) n-octadecyl ether ester (m=2, n=18), and methacrylate-(polyethylene glycol) n-heptadecyl ether (m=10, n=17) were mixed at a molar ratio of 1:1:1 and dissolved in toluene, where the mass ratio of the monomers to toluene was 1:3. To the solution, azobisisoheptonitrile of 0.2% of the mass of the monomers was added, and reacted at 75° C. for 5 hrs with stirring. The solution was cooled, to which an excessive amount of ethanol was added to precipitate the polymerization product. The resulting product was washed 3 times and dried to a constant weight in a vacuum oven at 80° C. $^1$H-NMR analysis showed that, the generated substance was a copolymer of the three monomers; DSC and TG tests showed that the copolymer had significant heat absorption and release functions and a good thermal stability.

Embodiment 9

Acrylate poly(ethylene glycol) n-hexadecyl ether ester (m=10, n=16), methacrylate poly(ethylene glycol) n-octadecyl ether ester (m=2, n=18) and methacrylate (polyethylene glycol) n-heptadecyl ether (m=10, n=17) were mixed at a molar ratio of 8:1:1 and dissolved in toluene, where the mass ratio of the monomers to toluene was 1:3. To the solution, azobisisoheptonitrile of 0.2% of the mass of the monomers was added, and reacted at 75° C. for 5 hrs with stirring. The solution was cooled, to which an excessive amount of ethanol was added to precipitate the polymerization product. The resulting product was washed 3 times and dried to a constant weight in a vacuum oven at 80° C. $^1$H-NMR analysis showed that, the generated substance was a copolymer of the three monomers; DSC and TG tests showed that the copolymer had significant heat absorption and release functions and a good thermal stability.

Embodiment 10

Acrylate poly(ethylene glycol) n-hexadecyl ether ester (m=10, n=16), methacrylate poly(ethylene glycol) n-octadecyl ether ester (m=2, n=18) and methacrylate-(polyethylene glycol) n-heptadecyl ether (m=10, n=17) were mixed at a molar ratio of 1:1:8 and dissolved in toluene, where the mass ratio of the monomers to toluene was 1:3. To the solution, azobisisoheptonitrile of 0.2% of the mass of the monomers was added, and reacted at 75° C. for 5 hrs with stirring. The solution was cooled, to which an excessive amount of ethanol was added to precipitate the polymerization product. The resulting product was washed 3 times and dried to a constant weight in a vacuum oven at 80° C. $^1$H-NMR analysis showed that, the generated substance was a copolymer of the three monomers; DSC and TG tests showed that the copolymer had significant heat absorption and release functions and a good thermal stability.

Embodiment 11

Acrylate poly(ethylene glycol) n-hexadecyl ether ester (m=10, n=16), methacrylate poly(ethylene glycol) n-octadecyl ether ester (m=2, n=18) and methacrylate-(polyethylene glycol) n-heptadecyl ether (m=10, n=17) were mixed at a molar ratio of 1:8:1 and dissolved in toluene, where the mass ratio of the monomers to toluene was 1:3. To the solution, azobisisoheptonitrile of 0.2% of the mass of the monomers was added, and reacted at 75° C. for 5 hrs with stirring. The solution was cooled, to which an excessive amount of ethanol was added to precipitate the polymerization product. The resulting product was washed 3 times and dried to a constant weight in a vacuum oven at 80° C. $^1$H-NMR analysis showed that, the generated substance was a copolymer of the three monomers; DSC and TG tests showed that the copolymer had significant heat absorption and release functions and a good thermal stability.

Embodiment 12

To a 2500 ml-three-necked flask equipped with a thermometer, a spherical condenser and a stirring paddle, predetermined mass of polyethylene glycol n-eicosyl ether (m=30, n=20), hydroquinone, stannous chloride, methyl methacrylate, and p-toluenesulfonic acid were added, and heated to 90° C. in an oil bath. The reaction was carried out for 6 hrs with stirring, and then the reaction solution was cooled to room temperature, to obtain a brown crude product methacrylate polyethylene glycol n-eicosyl ether ester. The crude product was subjected to reduced-pressure distillation to remove unreacted methyl methacrylate and water. The catalyst and the polymerization inhibitor were precipitated as colorless crystals, and then the solution was filtered, to obtain a brown-yellow liquid. The liquid was adjusted to neutral with a $Na_2CO_3$ solution having a mass concentration of 5%, and then washed with a saturated NaCl solution and extracted with 300 ml diethyl ether. The organic layer was separated and filtered, dried in a vacuum oven at a low temperature for 24 hrs, to obtain a pure product methacrylate polyethylene glycol n-eicosyl ether ester.

A cotton fabric was washed, dried and weighted, and then added to toluene and methacrylate polyethylene glycol n-eicosyl ether ester of 20% by mass, where the mass of toluene and methacrylate polyethylene glycol n-eicosyl ether ester was twice of that of the fabric. The mixture was shaken to make AEA dissolved uniformly, and then irradiated by γ-ray for 4 hrs. Then, the fabric was washed 3 times with ethanol and dried, to obtain a cotton fabric with heat storage function.

Embodiment 13

To a 2500 ml-three-necked flask equipped with a thermometer, a spherical condenser and a stirring paddle, measured polyethylene glycol n-hexadecyl ether (m=10, n=16), hydroquinone, stannous chloride, methyl methacrylate, and p-toluenesulfonic acid were added, heated in an oil bath to 90° C. The reaction was carried out for 6 hrs with stirring, and then the reaction solution was cooled to room temperature, to obtain a brown crude product methacrylate polyethylene glycol n-hexadecyl ether ester. The crude product was subjected to reduced-pressure distillation to remove unreacted methyl methacrylate and water. The catalyst and the polymerization inhibitor were precipitated as colorless crystals, and then the solution was filtered, to obtain a brown-yellow liquid. The liquid was adjusted to neutral with a $Na_2CO_3$ solution having a mass concentration of 5%, and then washed with a saturated NaCl solution and extracted with 300 ml diethyl ether. The organic layer was separated and filtered, dried in vacuum at a low temperature for 24 hrs, to obtain methacrylate polyethylene glycol n-hexadecyl ether ester having a purity of 97%.

Methacrylate polyethylene glycol n-hexadecyl ether ester and deionized water were mixed, where the mass of deionized water was 3 times that of methacrylate polyethylene glycol n-hexadecyl ether ester. To the mixture, sodium dodecyl p-toluenesulfonate (an emulsifying agent) of 5% by mass was added, and the mixture was heated to 60° C. and mixed uniformly with stirring. It was observed by a microscope that after emulsion droplets having a diameter of 3 to 8 millimeters were formed, stirring was stopped, and the mixture was cooled and filtered, to obtain solid microspheres. The produced microspheres can be used in additive materials for building wall to exert a significant energy-saving effect.

The present invention has been disclosed above through specific embodiments, but persons of ordinary skill in the art should understand that various variations and equivalent replacements may be made without departing from the scope of the present invention. Additionally, in order to be adapted to specific situations or materials in the technology of the present invention, various modifications may be made without departing from the protection scope of the present invention, which shall fall within the embodiments of the protection scope as defined by the appended claims.

What is claimed is:

1. A preparation method of a polymeric phase-change material, comprising:
    using 1, 2 or 3 of (meth)acrylate poly(ethylene glycol) n-alkyl ether esters as a raw material, wherein the (meth)acrylate poly(ethylene glycol) n-alkyl ether ester has a structural general formula of $CH_2=C(CH_3)-COO(CH_2CH_2O)_m C_n H_{2n+1}$ or $CH_2=CH-COO(CH_2CH_2O)_m C_n H_{2n+1}$, m=1 to 100, and n=10 to 50, and when the raw material is 2 or 3 of the (meth)acrylate poly(ethylene glycol) n-alkyl ether esters, the molar content of any raw material is not lower than 10%, and the sum of the molar contents of the 2 or 3 of the (meth)acrylate poly(ethylene glycol) n-alkyl ether esters in the mixture is 100%;
    washing the raw material with a solution of sodium hydroxide, potassium hydroxide, sodium carbonate or potassium carbonate having a mass percentage of 1% to 10% to remove a polymerization inhibitor to provide a washed raw material; and
    subjecting the washed raw material to reduced-pressure distillation, followed by a polymerization reaction according to one of the following processes:
    (1) polymerization reaction initiated by irradiation;
    (2) polymerization reaction initiated by an initiator: the initiator is a free radical polymerization initiator, a redox initiator, an anionic polymerization initiator or a cationic polymerization initiator; or
    (3) polymerization reaction in a solvent: the solvent is a non-polar organic solvent or a polar organic solvent, wherein the non-polar organic solvent comprises, but not limited to, benzene, toluene or xylene, polar organic solvent comprises, but not limited to, tetrahydrofuran, acetone, methyl ethyl ketone, N,N-dimethylformamide or N,N-dimethylacetamide; the ratio of the (meth)acrylate poly(ethylene glycol) n-alkyl ether ester to the solvent is 4:1 to 1:4;
    after the polymerization reaction is completed and a reaction solution is formed, adding a precipitating agent of water, methanol or ethanol to the reaction solution to form a precipitate of the polymeric phase-change material from the reaction solution; and
    washing and drying the precipitate to obtain a polymeric phase-change material as a powder or block.

2. The preparation method of a polymeric phase-change material according to claim 1, wherein during a UV irradiation polymerization process, an auxiliary initiator α-amino ketone is added, and the amount of the auxiliary initiator is 0.1% to 5% of the mass of the (meth)acrylate poly(ethylene glycol) n-alkyl ether ester.

3. The preparation method of a polymeric phase-change material according to claim 1, wherein during the polymerization process, a chain transfer agent is added, the chain transfer agent comprises 2-mercaptoethanol, dodecyl mercaptan or dithioester, and the amount of the chain transfer agent is 0.1% to 3% of the mass of the (meth)acrylate poly (ethylene glycol) n-alkyl ether ester.

4. The preparation method of a polymeric phase-change material according to claim 1, wherein during the polymerization process, a heat stabilizer is added, the heat stabilizer comprises 2,6-tert-butyl-4-methylphenol, tetra(4-hydroxy-3,5-di-tert-butylphenyl propionate)pentaerythritol ester, n-octadecyl 3,5-di-tert-butyl-4-hydroxyphenyl propionate, n-triphenyl phosphite or n-trinonylphenyl phosphite, and the amount of the heat stabilizer is 0.1% to 3% of the mass of the (meth)acrylate poly(ethylene glycol) n-alkyl ether ester.

5. The preparation method of a polymeric phase-change material according to claim 1, wherein during the polymerization process, a UV absorbent is added, the UV absorbent comprises a benzophenone; a benzotriazole; an n-alkyl salicylate, and the amount of the UV absorbent is 0.1% to 3% of the mass of the (meth)acrylate poly(ethylene glycol) n-alkyl ether ester.

6. The preparation method of a polymeric phase-change material according to claim 1, wherein during the polymerization process, a polymerization inhibitor is added, and the amount of the polymerization inhibitor is 0.05% to 0.1% of the mass of the (meth)acrylate poly(ethylene glycol) n-alkyl ether ester.

7. The preparation method of a polymeric phase-change material according to claim 1, wherein m=2 to 50, and n=12 to 22.

8. A use of the phase-change material (meth)acrylate poly (ethylene glycol) n-alkyl ether ester prepared by the preparation method according to claim 1 in the following aspects:
   (1) being used alone or in the form of a copolymer with other materials to prepare a capsule wall material, wherein the other material is a (meth)acrylate (methacrylic acid) styrene monomer;
   (2) being used to prepare a thermo-regulated fiber, which is further used to produce a thermo-regulated textile;
   (3) being used as a finishing agent of textile materials to prepare a textile having a thermo-regulated function; or
   (4) being used as an energy-saving material for building.

* * * * *